United States Patent
Hunter et al.

(10) Patent No.: US 8,826,824 B2
(45) Date of Patent: Sep. 9, 2014

(54) LINEAR MOTOR DRIVEN SYSTEM AND METHOD

(75) Inventors: Richard D Hunter, Ottawa (CA); Andreas Tanzer, Gatineau (CA)

(73) Assignee: HM Attractions Inc. (CA)

( * ) Notice: Subject to any disclaimer, the term of this patent is extended or adjusted under 35 U.S.C. 154(b) by 0 days.

(21) Appl. No.: 13/370,117

(22) Filed: Feb. 9, 2012

(65) Prior Publication Data

US 2012/0173065 A1 Jul. 5, 2012

Related U.S. Application Data

(63) Continuation of application No. 11/681,702, filed on Mar. 2, 2007, now Pat. No. 8,136,453.

(60) Provisional application No. 60/778,384, filed on Mar. 3, 2006.

(51) Int. Cl.
*A63G 1/00* (2006.01)

(52) U.S. Cl.
USPC .............. 104/70; 104/106; 104/73; 104/281; 472/117

(58) Field of Classification Search
USPC ........... 104/53, 56, 59, 63, 64, 69, 70, 72, 73, 104/290, 292
See application file for complete search history.

(56) References Cited

U.S. PATENT DOCUMENTS

| | | | |
|---|---|---|---|
| 3,404,635 A | | 10/1968 | Bacon et al. |
| 3,577,928 A | * | 5/1971 | Victorri .......................... 104/292 |
| 3,585,939 A | | 6/1971 | Laithwaite et al. |
| 3,667,397 A | * | 6/1972 | Haynes ......................... 104/294 |
| 3,667,398 A | * | 6/1972 | English ......................... 104/294 |
| 3,680,488 A | * | 8/1972 | Donlon ..................... 104/130.07 |
| 3,696,753 A | * | 10/1972 | Ross et al. ..................... 104/123 |
| 3,738,281 A | * | 6/1973 | Waidelich ..................... 104/23.2 |
| 3,770,995 A | * | 11/1973 | Eastham et al. ............... 104/294 |
| 3,830,161 A | * | 8/1974 | Bacon ............................. 104/70 |
| 3,882,790 A | * | 5/1975 | Winkle et al. ................. 104/286 |
| 3,889,605 A | | 6/1975 | Bacon |
| 3,947,741 A | | 3/1976 | Ball et al. |
| 3,952,666 A | * | 4/1976 | Gladish ........................ 104/23.2 |
| 4,061,089 A | * | 12/1977 | Sawyer ......................... 104/23.2 |
| 4,063,517 A | * | 12/1977 | Nardozzi, Jr. ................... 104/35 |
| 4,175,637 A | * | 11/1979 | Bertelsen ...................... 180/128 |
| 4,233,906 A | | 11/1980 | Seiler |

(Continued)

FOREIGN PATENT DOCUMENTS

| CA | 2473804 | 8/2003 |
|---|---|---|
| CN | 2303755 | 1/1999 |

(Continued)

OTHER PUBLICATIONS

International Search Report for PCT/CA2007/000329, dated Jun. 5, 2007.

(Continued)

*Primary Examiner* — Jason C Smith
(74) *Attorney, Agent, or Firm* — Finnegan, Henderson, Farabow, Garrett & Dunner, LLP

(57) ABSTRACT

A vehicle motion control system comprising: a sliding surface; a vehicle adapted to slide on said sliding surface; and a linear motor associated with the vehicle and the sliding surface for affecting sliding motion of the vehicle on the sliding surface.

36 Claims, 13 Drawing Sheets

(56) References Cited

U.S. PATENT DOCUMENTS

| | | | | |
|---|---|---|---|---|
| 4,299,171 A | * | 11/1981 | Larson | 104/70 |
| 4,484,739 A | * | 11/1984 | Kreinbihl et al. | 472/88 |
| 4,984,783 A | * | 1/1991 | Fujimaki | 472/88 |
| 4,991,514 A | * | 2/1991 | Powell et al. | 104/60 |
| 5,069,443 A | * | 12/1991 | Shiratori | 472/88 |
| 5,128,569 A | | 7/1992 | Gladish | |
| 5,277,125 A | | 1/1994 | DiFonso et al. | |
| 5,336,132 A | | 8/1994 | Murakami | |
| 5,382,026 A | | 1/1995 | Harvard et al. | |
| 5,403,238 A | * | 4/1995 | Baxter et al. | 472/43 |
| 5,433,671 A | * | 7/1995 | Davis | 472/117 |
| 5,540,622 A | * | 7/1996 | Gold et al. | 472/117 |
| 5,649,489 A | | 7/1997 | Powell et al. | |
| 5,668,421 A | * | 9/1997 | Gladish | 310/12.11 |
| 5,669,821 A | | 9/1997 | Prather et al. | |
| 5,860,364 A | * | 1/1999 | McKoy | 104/59 |
| 6,237,499 B1 | * | 5/2001 | McKoy | 104/59 |
| 6,354,223 B2 | * | 3/2002 | McKoy | 104/72 |
| 6,397,755 B1 | * | 6/2002 | Kamler | 104/53 |
| 6,413,165 B1 | * | 7/2002 | Crandall et al. | 472/117 |
| 6,485,372 B2 | * | 11/2002 | Stuart et al. | 472/117 |
| 6,629,501 B2 | * | 10/2003 | McKoy | 104/72 |
| 6,659,237 B1 | * | 12/2003 | Pribonic | 188/165 |
| 6,856,048 B2 | | 2/2005 | Funken et al. | |
| 6,857,964 B2 | * | 2/2005 | Hunter | 472/116 |
| 6,860,209 B2 | * | 3/2005 | McKoy | 104/72 |
| 6,971,317 B2 | * | 12/2005 | McKoy | 104/72 |
| 7,056,220 B2 | * | 6/2006 | Hunter | 472/117 |
| D548,810 S | * | 8/2007 | Hunter | D21/821 |
| D567,322 S | * | 4/2008 | Hunter | D21/821 |
| 7,371,183 B2 | * | 5/2008 | Henry et al. | 472/117 |
| 7,437,998 B2 | * | 10/2008 | Burger et al. | 104/73 |
| 7,597,630 B2 | * | 10/2009 | Henry | 472/128 |
| 7,699,006 B2 | * | 4/2010 | Miller et al. | 104/281 |
| 7,699,007 B2 | * | 4/2010 | Miller et al. | 104/281 |
| 7,713,134 B2 | * | 5/2010 | Hunter | 472/117 |
| 7,740,542 B2 | * | 6/2010 | Henry et al. | 472/128 |
| 7,918,741 B2 | * | 4/2011 | Hunter et al. | 472/117 |
| 8,038,542 B2 | * | 10/2011 | Hunter et al. | 472/117 |
| 8,136,453 B2 | * | 3/2012 | Hunter et al. | 104/60 |
| 2002/0142851 A1 | * | 10/2002 | Hunter | 472/117 |
| 2004/0077426 A1 | * | 4/2004 | Hunter | 472/137 |
| 2004/0123766 A1 | * | 7/2004 | van den Bergh et al. | 104/281 |
| 2005/0098057 A1 | * | 5/2005 | McKoy | 104/53 |
| 2005/0192108 A1 | * | 9/2005 | Hunter | 472/117 |
| 2005/0288112 A1 | * | 12/2005 | Hunter | 472/117 |
| 2006/0016366 A1 | * | 1/2006 | Feix et al. | 104/286 |
| 2006/0032395 A1 | * | 2/2006 | Matuschek et al. | 104/286 |
| 2006/0219124 A1 | * | 10/2006 | Jordan | 104/23.1 |
| 2007/0034106 A1 | * | 2/2007 | Miller et al. | 104/286 |
| 2007/0060403 A1 | * | 3/2007 | Henry et al. | 472/117 |
| 2007/0204759 A1 | * | 9/2007 | Hunter | 104/292 |
| 2007/0207866 A1 | * | 9/2007 | Hunter | 472/43 |
| 2007/0207867 A1 | * | 9/2007 | Hunter | 472/43 |
| 2007/0207869 A1 | * | 9/2007 | Hunter | 472/117 |
| 2012/0173065 A1 | * | 7/2012 | Hunter et al. | 701/22 |

FOREIGN PATENT DOCUMENTS

| | | |
|---|---|---|
| DE | 2021834 | 3/1972 |
| DE | 2900053 A1 | 7/1980 |
| DE | 4344755 | 6/1995 |
| EP | 0381136 A1 | 8/1990 |
| EP | 0487744 | 6/1991 |
| GB | 1307833 | 2/1973 |
| JP | 52-149712 | 12/1977 |
| JP | 5435914 | 3/1979 |
| JP | 327703 | 2/1991 |
| JP | 50-122627 | 3/2003 |
| WO | 9831444 | 7/1998 |
| WO | WO 03/063991 A1 | 8/2003 |
| WO | 2004085744 | 10/2004 |

OTHER PUBLICATIONS

European Search Report for EP 07250876, dated Jun. 5, 2007.
Chinese Office Action in Chinese Patent Application No. 200780007714.3 (three pages), with three pages of English translation.
Jan. 20, 2010 Office Action in European Patent Application No. 07250876.5-2318 (four pages).
International Search Report for PCT/CA2007/000333, dated Jun. 15, 2007.
Chinese Office Action in Chinese Patent Application 200780007714.3 (four pages), with six pages of English translation.
Request for Inter Partes Reexamination of U.S. Patent No. 8,136,453, 168 pages, Sep. 15, 2012, (Reexam Control No. 95/002,419).
Request for Inter Partes Reexamination of U.S. Patent No. 7,918,741, 59 pages, Sep. 15, 2012, (Reexam Control No. 95/002,384).
Request for Inter Partes Reexamination of U.S. Patent No. 8,038,542, 162 pages, Sep. 15, 2012, (Reexam Control No. 95/002,416).
Office Action in *Inter Partes Reexamination*, "Right to Appeal Notice", dated Nov. 22, 2013, Control No. 95/002,419 (USP 8,136,453) 44 pages.
Third Party Requester's Notice of Appeal, filed Dec. 20, 2013, Control No. 95/002,419 (USP 8,136,453), 2 pages.
Office Action in *Inter Partes Reexamination*, "Notice of Intent to Issue *Inter Partes* Reexamination Certificate", dated Apr. 18, 2014, Control No. 95/002,419 (USP 8,136,453) 13 pages.
Office Action in *Inter Partes Reexamination*, "Right to Appeal Notice", dated Nov. 13, 2013, Control No. 95/002,416 (USP 8,038,542) 58 pages.
Office Action in *Inter Partes Reexamination*, "Right to Appeal Notice", dated Nov. 15, 2013, Control No. 95/002,416 (USP 8,038,542) 58 pages.
Third Party Requester's Notice of Appeal, filed Dec. 16, 2013, Control No. 95/002,419 (USP 8,038,542), 2 pages.
Office Action in *Inter Partes Reexamination*, "Notice of Intent to Issue *Inter Partes* Reexamination Certificate", dated Apr. 11, 2014, Control No. 95/002,416 (USP 8,038,542) 13 pages.
*Inter Partes Reexamination* Certificate, issued Apr. 28, 2014, Control No. 95/002,416 (USP 8,038,542 C1), 5 pages.
Reply to Office Action in *Inter Partes Reexamination*, filed Nov. 22, 2013, Control No. 95/002,384, (USP 7,918,741) 42 pages.
Office Action in *Inter Partes Reexamination*, "Action Closing Prosecution", dated Apr. 25, 2014, Control No. 95/002,384, (USP 7,918,741) 11 pages.
Office Action in *Inter Partes Reexamination*, "Order Granting/Denying Request," dated Nov. 15, 2012, Control No. 95/002,384, (USP 7,918,741) 14 pages.
Office Action in *Inter Partes Reexamination*, dated Nov. 15, 2012, Control No. 95/002,384 (USP 7,918,741) 9 pages.
Reply to Office Action *Inter Partes Reexamination*, filed Jan. 14, 2013, Control No. 95/002,384, (USP 7,918,741) 45 pages.
Requester's Comments to Patent Owner's Response to Nov. 15, 2012 Office Acton, Control No. 95/002,384, (USP 7,918,741) 37 pages.
Office Action in *Inter Partes Reexamination*, dated Sep. 24, 2013, Control No. 95/002,384; (USP 7,918,741) 39 pages.
Office Action in *Inter Partes Reexamination*, "Order Granting/Denying Request," dated Nov. 16, 2012, Control No. 95/002,416, (USP 8,038,542) 16 pages.
Office Action in *Inter Partes Reexamination*, dated Nov. 16, 2012, Control No. 95/002,416, (USP 8,038,542) 10 pages.
Petition to Review Refusal to Order *Inter Partes Reexamination*, filed Dec. 17, 2012, Control No. 95/002,416, (USP 8,038,542) 13 pages.
Office Action in *Inter Partes Reexamination*, dated Feb. 13, 2013, Control No. 95/002,416, (USP 8,038,542) 9 pages.
Reply to Office Action in *Inter Partes Reexamination*, filed Jan. 14, 2013, Control No. 95/002,416, (USP 8,038,542) 46 pages.
Requester's Comments to Patent Owner's Response to Nov. 16, 2012 Office Action, Control 95/002,416, (USP 8,038,542) 43 pages.
Office Action in *Inter Partes Reexamination*, "Action Closing Prosecution," dated May 5, 2013, Control No. 95/002,416, (USP 8,038,542) 51 pages.

(56) References Cited

OTHER PUBLICATIONS

Patent Owner's Comments and Proposed Amendments Responsive to Action Closing Prosecution, filed Jul. 2, 2013, Control No. 95/002,415, (USP 8,038,542) 24 pages.

Requester's Comments in Response to Jul. 2, 2013 Patent Owner's Comments to May 3, 2013 Action Closing Prosecution and in Response to May 3, 2013 Action Closing Prosecution, filed Aug. 1, 2013, Control No. 95/002,416, (USP 8,038,542) 22 pages.

Office Action in *Infer Partes Reexamination*, "Order Granting/Denying Request," dated Nov. 16, 2012, Control No. 95/002,419, (USP 8,136,453) 19 pages.

Office Action in *Inter Partes Reexamination*, dated Nov. 16, 2012, Control No, 95/002,419 (USP 8,136,453) 9 pages.

Petition to Review Refusal to Order *Inter Partes Reexamination*, filed Dec. 17, 2012, Control No. 95/002,419, (USP 8,136,453) 21 pages.

Reply to Office Action in *Inter Fades Reexamination*, filed Jan. 14, 2013, Control No. 95/002,419, (USP 8,136,453) 46 pages.

Office Action in *Inter Partes Reexamination*, dated Feb. 13, 2013, Control No. 95/002,419, (USP 8,136,453) 12 pages.

Office Action in *Inter Partes Reexamination*, "Action Closing Prosecution," Jun. 17, 2013, Control No. 95/002,419, (USP 8,136,453) 52 pages.

Patent Owner's Comments and Proposed Amendments Responsive to Action Closing Prosecution, filed Jul. 15, 2013, Control No. 95/002,419, (USP 8,136,453) 27 pages.

Requester's Comments in Response to Jul. 15, 2013 Patent Owner's Comments to Jun. 17, 2013 Action Closing Prosecution and in Response to Jun. 17, 2013 Action Closing Prosecution, filed Aug. 13, 2013, Control No. 95/002,419, (USP 8,136,453) 23 pages.

\* cited by examiner

LINEAR MOTOR DRIVEN SYSTEM AND METHOD

CROSS-REFERENCE TO RELATED APPLICATIONS

This application is a continuation of U.S. patent application Ser. No. 11/681,702, filed Mar. 2, 2007, which claims the benefit of U.S. Provisional Application Ser. No. 60/778,384, filed Mar. 3, 2006, which is incorporated herein by reference in its entirety.

FIELD OF THE INVENTION

This invention relates generally to systems driven by linear motors, and in particular to systems and methods of moving vehicles utilizing linear motors.

BACKGROUND OF THE INVENTION

In the past few decades, water-based amusement rides have become increasingly popular. Such rides can provide similar thrills to roller-coaster rides, with the additional features of the cooling effect of water and the excitement of being splashed.

The most common water-based amusement rides are flume-style waterslides in which a participant slides along a channel or "flume", either on his or her body, or on or in a vehicle. Water is provided in the flume to provide lubrication between the body/vehicle and the flume surface, and to provide the above-mentioned cooling and splashing effects. Typically, the motion of the participant in the flume is controlled predominantly by the contours of the flume (hills, valleys, turns, drops, etc.) in combination with gravity.

As thrill expectations of participants have increased, demand for greater control of participants' movement in the flume has correspondingly increased. Thus various techniques have been applied to accelerate or decelerate participants by means other than gravity. For example, a participant may be accelerated or decelerated using powerful water jets. Other rides use a conveyor belt to convey a participant to the top of a hill the participant would not otherwise crest on the basis of his or her momentum alone. For safety reasons, such techniques are generally used only on waterslides where the participant slides along the flume in a vehicle.

However, such existing means of controlling the movement of a participant raise safety and comfort concerns even when he or she is riding in a vehicle. For example, a water jet powerful enough to affect the motion of a waterslide vehicle could injure the participant if he or she is hit in the face or back of the head by the jet, as might be the case if the participant falls out of the vehicle. Similarly, a participant extending a limb out of a vehicle could be injured by a fast-moving conveyor belt.

These same issues arise in other systems for transporting people and objects. For example, in warehousing or manufacturing facilities conveyor belts and rollers have been used to transport objects in the facility. These systems have limited flexibility and control and may cause safety concerns. In public transit of people, vehicles rolling on rails have been used.

SUMMARY OF THE INVENTION

In a broad aspect, the invention provides a vehicle motion control system comprising: a sliding surface; a vehicle adapted to slide on said sliding surface; and a linear motor associated with the vehicle and the sliding surface for affecting sliding motion of the vehicle on the sliding surface.

In another broad aspect, the invention provides a method of controlling motion of a vehicle sliding on a sliding surface comprising operating a linear motor associated with the vehicle and the sliding surface.

In another broad aspect, the invention provides a vehicle motion control system for an amusement ride comprising: a sliding surface; a vehicle adapted to slide on said sliding surface; and a linear motor associated with the vehicle and the sliding surface for affecting sliding motion of the vehicle on the sliding surface.

BRIEF DESCRIPTION OF THE DRAWINGS

Embodiments of the invention will now be described with reference to the attached drawings in which.

DETAILED DESCRIPTION OF THE DRAWINGS

The present invention is directed to systems in which participants or objects ride in vehicles which slide on a sliding surface. As the term is used in this application, "sliding" refers to the action of moving substantially smoothly along a weight-bearing sliding surface while remaining substantially in contact with it. This is in contrast to "rolling" which refers to the action of moving along a weight bearing riding surface by the relative rotation of wheels, rollers or bearings.

In a waterslide context, sliding is typically facilitated by the use of water as a lubricant between the vehicle and the sliding surface. In such cases, on occasion, such as when the layer of water has sufficient depth or lubrication and the vehicle has sufficient speed, direct contact between the vehicle and the flume may be lost very briefly and temporarily with the vehicle skimming atop a very thin layer of water. However, such temporary skimming is still considered to fall within the meaning of sliding.

Embodiments of the invention will now be described.

Flume-style waterslides typically consist of a channel or "flume" supplied with water and which accommodates a vehicle for sliding therein. The flume typically has hills and valleys as well as turns to increase the excitement of the ride for the participant.

Figure 1:
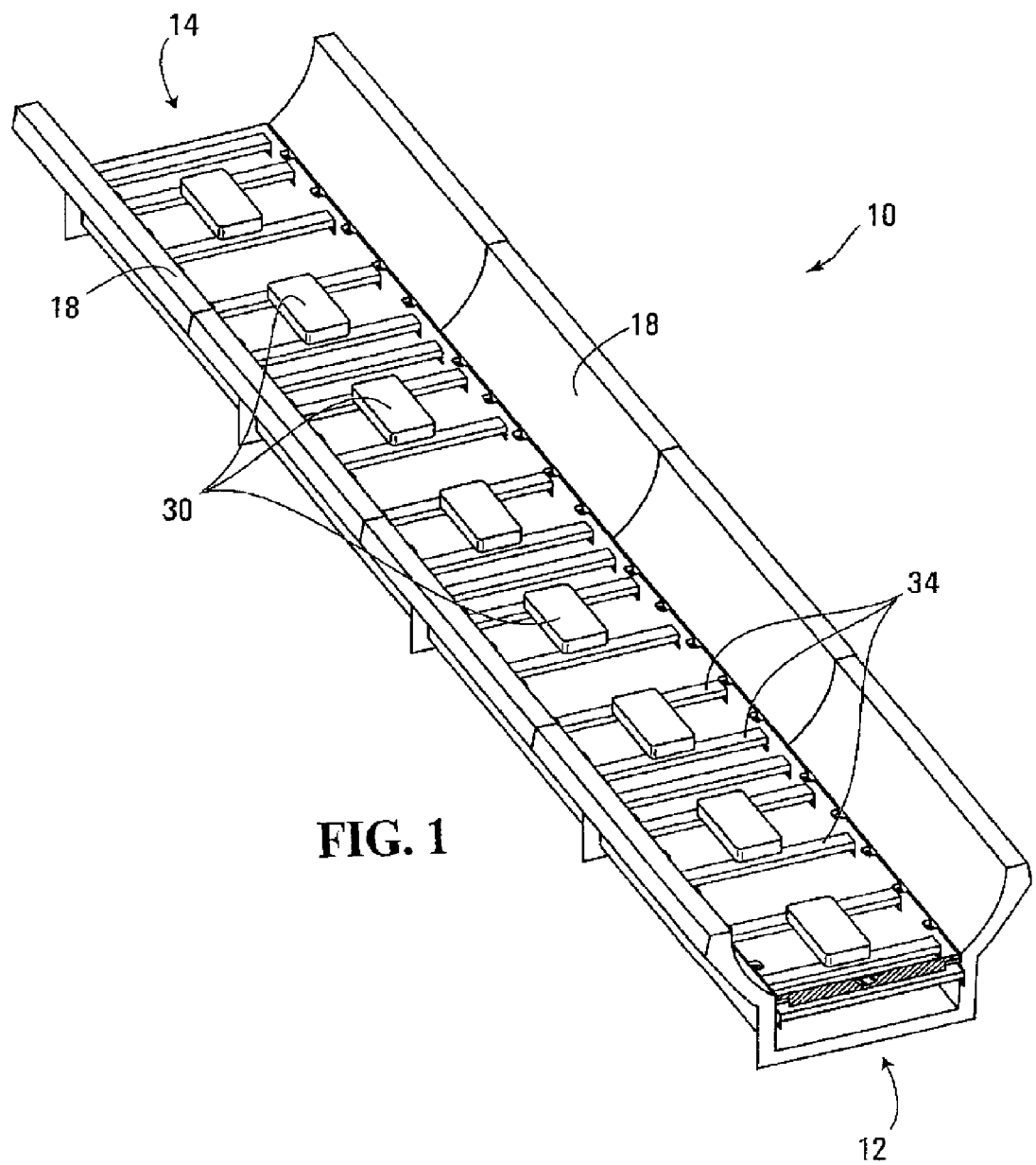
FIG. 1 is a perspective view of an uphill section of a flume of an embodiment of the present invention with a sliding surface of the flume removed to show components underneath.
Figure 2:
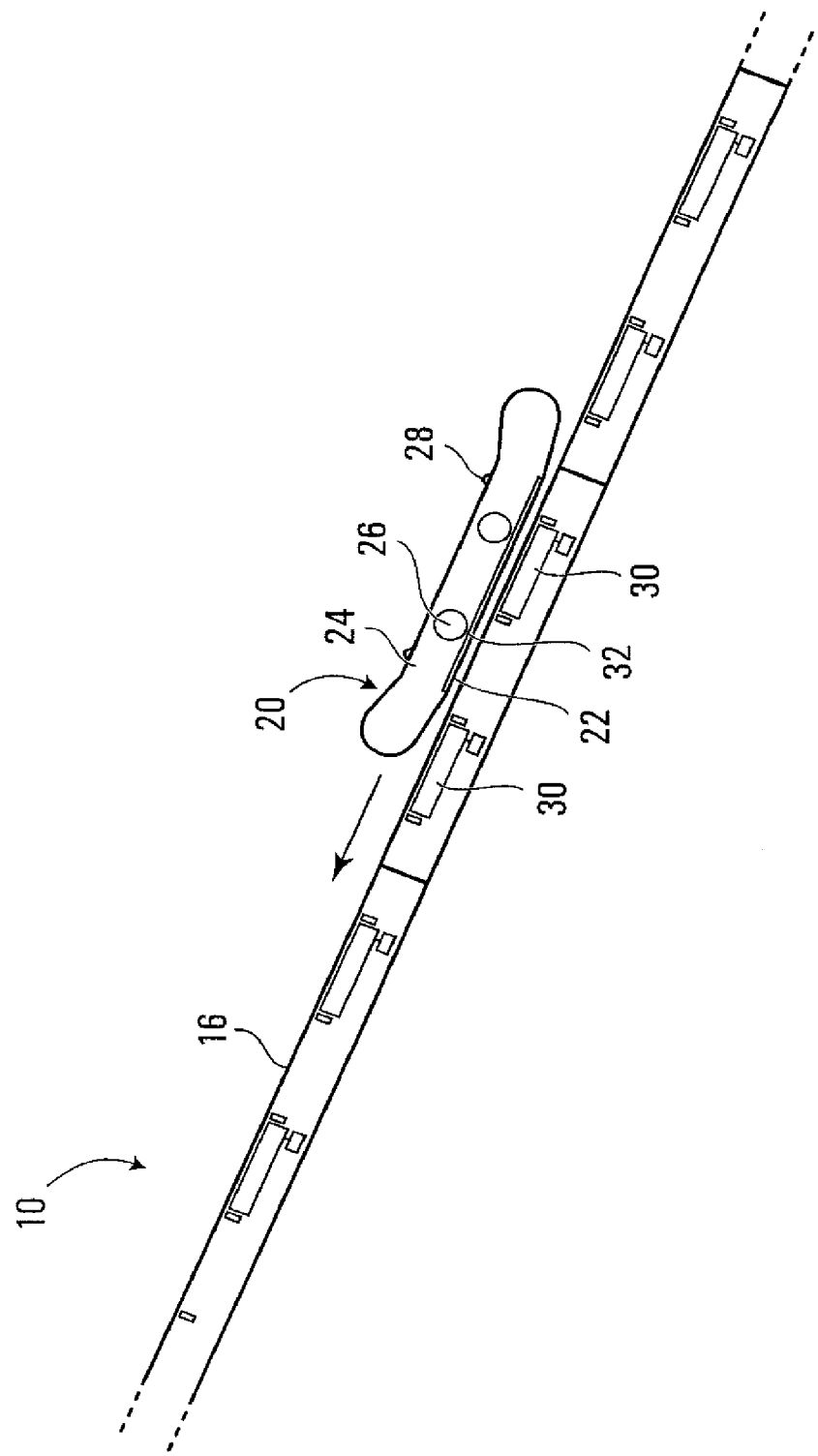
FIG. 2 is a side cross-sectional view of a portion of the uphill flume section of FIG. 1 with the side walls of the flume removed to show a vehicle thereon.
Figure 3:
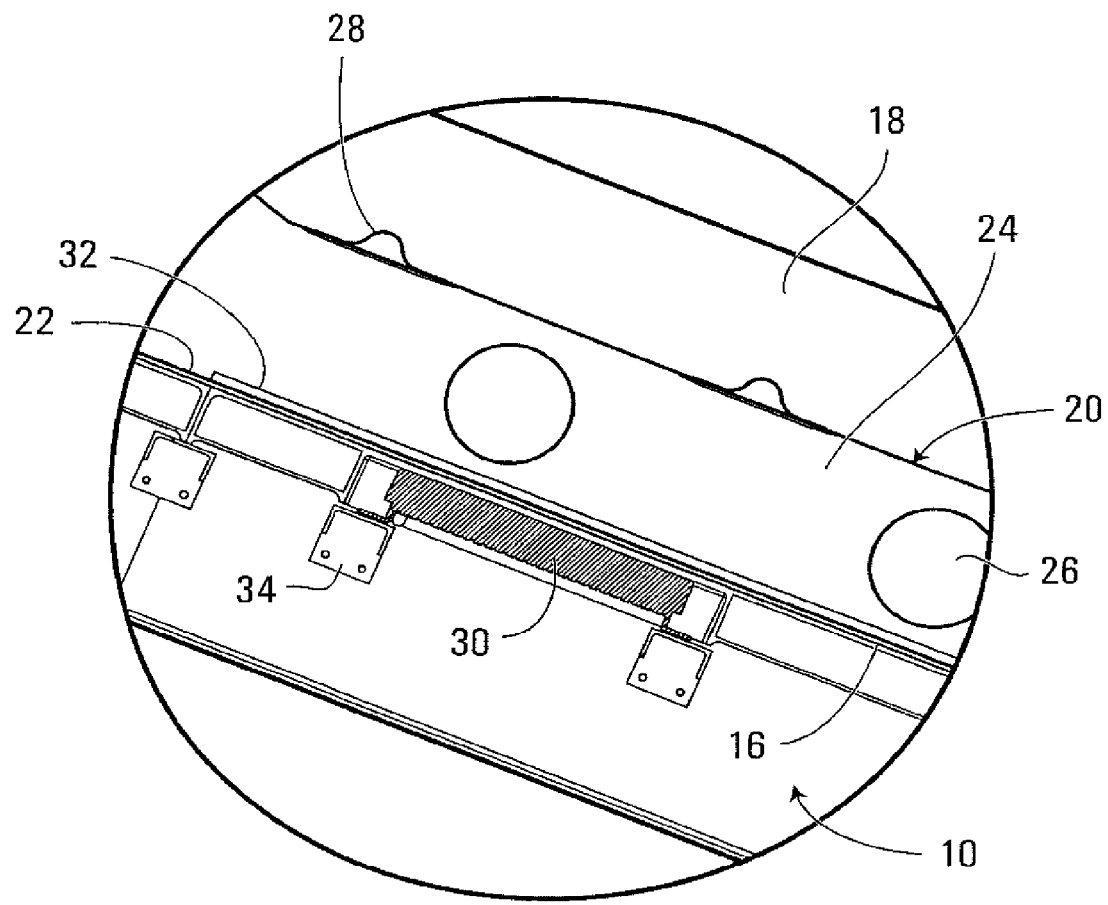
FIG. 3 is an enlarged side cross-sectional view of a portion of the uphill flume section of FIG. 1 with the vehicle sliding thereon.
Figure 4:
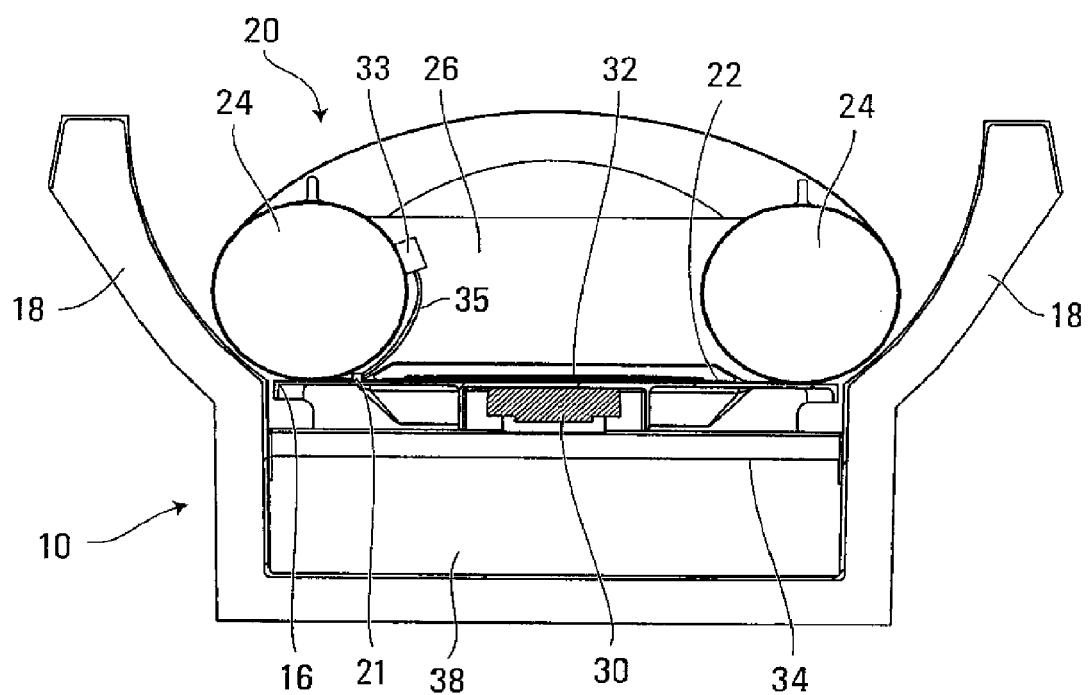
FIG. 4 is a cross-sectional end view of the portion of the uphill flume section shown in FIG. 1 with the vehicle sliding thereon.

FIGS. 1 to 4 show an exemplary uphill section of such a flume 10 in accordance with an embodiment of the invention. In FIGS. 1 and 2, a vehicle 20 would normally move from the right to the left. In operation, the section illustrated in FIG. 1 is connected at its entry 12 and exit 14 ends to other sections of the flume ride so as to provide a continuous flume from start to finish of the ride. The illustrated section would also normally be supported underneath by appropriate framing (not shown), or by a sloped section of land (not shown).

The flume 10 itself generally consists of a sliding surface 16 (removed in FIG. 1 to illustrate components therebeneath), as well as two side walls 18 (removed in FIG. 2 to show the vehicle 20). The sliding surface 16 is the surface on which the vehicle 20 slides, while the side walls 18 assist in ensuring that the vehicle 20 and sufficient lubricant, in this example water, remains in the flume 10. In this embodiment, the surface has approximately 1 to 3 mm of water. The sliding surface 16 and side walls 18 may be made of any material providing sufficient toughness and rigidity, and may be smooth so as to permit easy sliding of the vehicle 20 thereon.

The sliding surface 16 and side walls 18 may be made of fiberglass. Examples of fiberglass include a combination of a neo-isothalic gelcoat chop stand E-Glass or S-Glass fiber, woven roving and isothalic and orthothalic resins.

In this embodiment, the vehicle 20 is a raft adapted to carry one or more riders thereon and is provided at its bottom with a vehicle bottom surface 22 adapted to slide along the sliding surface 16 of the flume 10 during normal operation. The vehicle 20 in this embodiment has side tubes 24, thwarts 26 and handles 28.

In the present embodiment flume ride, means are provided to impart a thrusting force to the vehicle 20 to assist it up the illustrated uphill section of the flume 10. Such a force is desirable for example where the speed of the vehicle 20 arriving at the entry end 12 of the illustrated section from other parts of the flume ride is not sufficient to propel the vehicle 20 to the exit end 14 of the illustrated section at a desired speed, on the basis of the vehicle's momentum alone. To provide the external force necessary to achieve the desired speed at the exit end 14 of the illustrated flume section 10, a linear motor is used.

There exist many types of linear motors, including linear induction motors (LIMs) and linear synchronous motors, suitable for the present application. The exemplary linear motor used in the illustrated embodiment is a squirrel cage style linear induction motor.

Conceptually, the linear induction motor of the embodiment is a standard rotary squirrel cage motor which has been opened out flat with the stator units lying in a spaced linear configuration and the rotor being replaced by a flat reaction plate. The units of the stator, known as linear induction motor units ("LIM units") when laid out flat, each consist of a 3 phase winding around a laminated iron core. When the LIM units are energized by an alternating current (AC) supply, a travelling wave magnetic field is produced. While a rotary motor effects rotary movement in a rotor, the flat stator of the linear induction motor effects linear movement in the reaction plate.

The reaction component or plate in such LIMs is typically a sheet of any electrically conductive metal, for example aluminum or copper. The conducting sheet may be backed by a sheet of ferromagnetic substantially non-electrically conductive metal, such as steel or iron, to enhance the performance of the reaction plate by providing return paths for the stator's magnetic flux. Currents induced in the reaction plate by the LIM units' travelling field create a secondary magnetic field. It is the reaction between these two magnetic fields which imparts the linear thrust to the reaction plate. The magnitude of the thrust imparted to the reaction plate is controlled largely by the voltage and frequency of the electrical supply to the LIM units and the dimensions and materials of the reaction plate. In this embodiment, the reaction plate 32 is a ⅛" sheet of 1050, 1100, 1200 or 5005 aluminum and a 3/32" sheet of A36 galvanized steel affixed above the sheet of aluminum. Also in this embodiment, an inverter supplies a controlled amount of power to the LIMs which controls the amount of thrust applied to the reaction plates. The thrust can be reversed if the polarity of the power to the motor is charged.

In the context of a waterslide amusement ride, a LIM can control various aspects of the motion of a vehicle to which the reaction plate is affixed, depending on the configuration of the LIM units and the shape of the reaction plate. For example, the LIM can accelerate or decelerate the vehicle. It can also maintain the speed of the vehicle as it proceeds up an incline, or cause it to turn around corners. If the reaction plate is circular, it can also cause the vehicle to rotate.

In the exemplary embodiment shown in the FIGS. 1 to 4, the LIM units 30 are located under the sliding surface 16 of the flume 10 in spaced linear relationship in the direction of travel of the ride vehicle 20, and the reaction plate 32 is mounted at the bottom of the vehicle 20.

As shown in FIGS. 1 to 4, each LIM unit 30 of this embodiment is rectangular in shape and is substantially flat. In the present embodiment, the dimensions of each LIM unit are 500 mm in length, 250 mm in width, and 85 mm in height and provides a thrust of 600 N at 480V, 60 Hz AC current and 20% duty cycle. Of course other dimensions, other voltages, other frequencies and other duty cycles may be used to provide a required thrust.

The LIM units 30 are mounted longitudinally to a flume frame 34 such that they are located just beneath the sliding surface 16 and substantially centered between the side walls 18. The upper surface of the LIM units 30 may alternatively form part of the sliding surface 16. In order to reduce cost, each LIM unit 30 is spaced from adjacent LIM units 30. In this embodiment, the LIM units 30 are spaced 571.5 mm apart.

The reaction plate 32 is also substantially flat and elliptical or rectangular. In the preferred embodiment the reaction plate 32 is a ⅛" sheet of aluminum and a 3/32" sheet of galvanized steel affixed above the sheet of aluminum. The reaction plate 32 is 72" in length and 18" in width, with the width of the steel sheet being 2" narrower than the aluminum sheet such that the aluminum sheet extends beyond the width of the steel sheet by 2" on each side. Examples of suitable reaction plates are detailed in a co-owned application entitled "Reaction Component for a Linear Induction Motor", filed concurrently with the present application and incorporated herein by reference in its entirety.

The reaction plate 32 is affixed at the bottom of the vehicle 20 and may be covered by the vehicle bottom surface 22 so as to provide a smooth interface between the vehicle bottom surface 22 and the flume sliding surface 16. The distance between the reaction plate 32 and the LIM units 30 may be minimized to increase the force imparted on the vehicle 20 by the LIM units. In the present embodiment, the bottom surface 22 of the vehicle is made of vinyl rubber, and the gap between the reaction plate 32 and the LIM units 30 is about 3/8"-5/8" during operation. The weight of the riders may be distributed to minimize the gap along the length of the vehicle; for example, in a three person vehicle, if only two people are riding, they ride at the front and back, if only one person is riding, they ride in the middle.

As shown in FIG. 1, the flume 10 is provided with support structures such that the sliding surface 16 is supported by the flume frame 34. A conduit 38 is provided below the sliding surface 16 to accommodate electrical wires (not shown) and to allow water seeping between the sliding surface 16 and the side walls 18 to flow downhill. All electrical elements are sealed and are double ground faulted to ensure safety.

Figure 5:
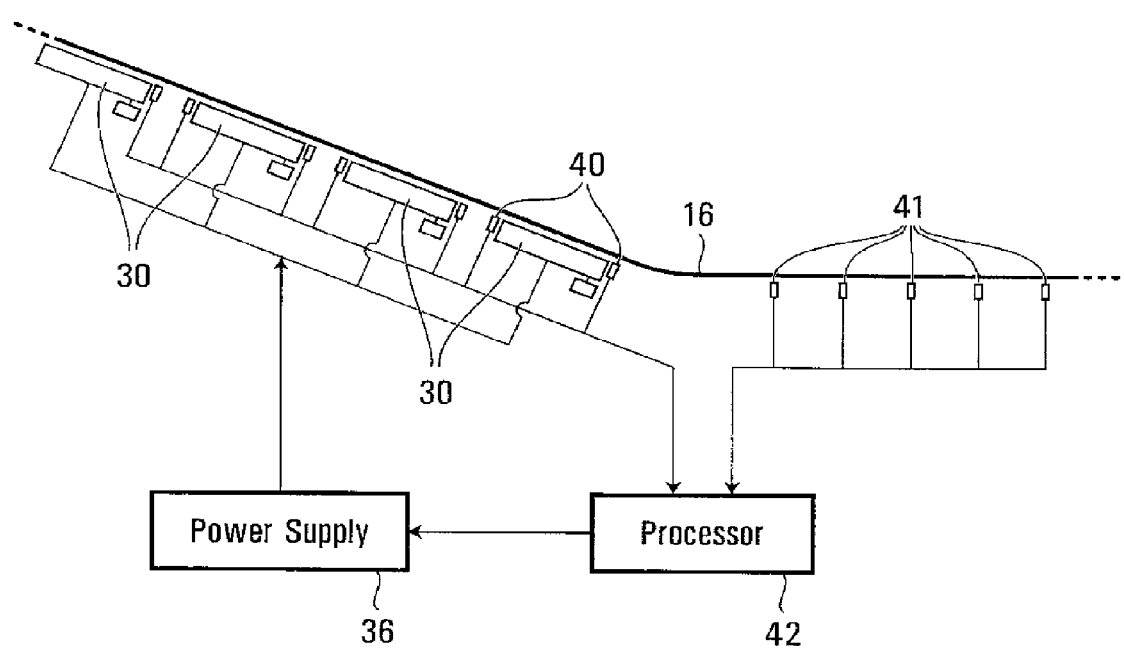
FIG. 5 is a schematic view of an exemplary control system for the uphill flume section of FIG. 1.

Referring to FIG. 5, the LIM units 30 are electrically connected to a controlled power supply 36. The flume 10 in this embodiment is also provided with proximity sensors 41 upstream of the section illustrated in FIGS. 1 and 2, and proximity sensors 40 throughout the section illustrated in FIGS. 1 and 2 such that the voltage and/or frequency of the electrical supply to the LIM units 30 can be varied as a function of the speed of the vehicle to ensure that the vehicle arrives at the exit end 14 of the illustrated section at the desired speed. Such speed sensors may be, for example, inductive proximity detectors.

The vehicle 20 may also incorporate a control panel 33. The control panel 33 may be connected by connectors 35 to sensors 21 mounted remotely at the bottom of the slide 38. The rider can operate the control panel 33 and provide input to the processor 42 to influence the intensity of the magnetic field allowing for a slower or faster speed in the uphill sections of the flume. If the plate is replaced with conductive coils, and the control panel is connected to the conductive coils, the rider can operate the control pane to provide input to affect the electrical characteristics and thus operation of the conductive coils. The rider, if the coils or plate is of appropriate flexibility, can also use the handles 28 to flex the vehicle 20 to change the shape of the reaction plate 32 and accordingly influence the ride.

In operation, the illustrated flume section 10 is provided with water using any of a number of known means, for example recessed water jets located in the side walls, water flowing from a higher point in the flume, etc. The water provides lubrication between the bottom surface 22 of the vehicle and the sliding surface 16 of the flume 10 so as to facilitate the sliding movement of the vehicle 20 up the section.

At the start of the ride, the vehicle 20 is launched from a launching station (not shown) of the flume and proceeds along the flume. As shown in FIG. 5, the LIM is controlled by a drive controller or processor 42. In particular, as the vehicle 20 approaches the illustrated section, the proximity sensors 41 mounted upstream of the illustrated section measure the speed, between each of these proximity sensors, of the vehicle 20. This information is communicated to a processor 42 which calculates, based on the measured speed, a voltage and frequency to be supplied to the LIM units 30 which would likely exert sufficient force to ensure that the vehicle 20 arrives at the exit end 14 of the illustrated flume section 10 at the desired speed. In order to improve the accuracy of this calculation, vehicle weight detectors (not shown) may also be utilized. The processor then causes the power supply 36 to supply this voltage and frequency to the LIM units 30. The LIM units 30 are powered successively as the vehicle is sensed by the proximity sensors 40. The LIM units may be powered, for example, individually, in pairs, or three at a time with variable power levels. This way the amount of power that is used by the system is minimized and the power is concentrated under the vehicle where the reaction plate 32 is located.

As the vehicle 20 mounts the illustrated flume section 10, the magnetic field generated by the LIM units 30 provides a linear thrust to the reaction plate 32 affixed to the bottom of the vehicle 20, causing the vehicle 20 to maintain its speed, or accelerate up the illustrated section 10. As the vehicle 20 proceeds up the illustrated section 10, the proximity sensors 40 measure the speed of the vehicle 20 and the power supply to the LIM units 30 is adjusted accordingly.

While the sensors 40 and 41 discussed above sense a linear speed of the vehicle 20, other sensors could be used to measure one or more motion parameters of the vehicle such as linear speed, rotational speed, and direction of movement of the vehicle 20, and cause the LIM units 30 to operate so as to affect motion of the vehicle 20 in a desired manner, for example by decelerating the vehicle 20, slowing its rotation, or changing its direction of motion.

As described, the illustrated embodiment reduces the need for a direct contact outside force on the vehicle 20 to assist it up the incline, a feature which improves the safety of the ride while also increasing its rider comfort and aesthetic appeal.

While this embodiment has been described as an amusement ride feature, it is to be understood that the present invention also contemplates an amusement ride embodying such an amusement ride feature, a method of using a LIM to affect motion of a vehicle in an amusement ride, a ride vehicle having a reaction plate for use on a LIM-enabled ride, and a LIM-enabled sliding surface having LIM units mounted thereebeneath.

While this embodiment ride has been described as being a waterslide ride, it is to be understood that the present invention can be applied in non-water sliding amusement rides, including so-called dry rides. One example would be a ride in which a vehicle slides on a sliding surface having a low-friction coating such as TEFLON™. The system also applies general to systems for sliding vehicles, whether lubricated or not, utilizing a linear motor.

Figure 6:
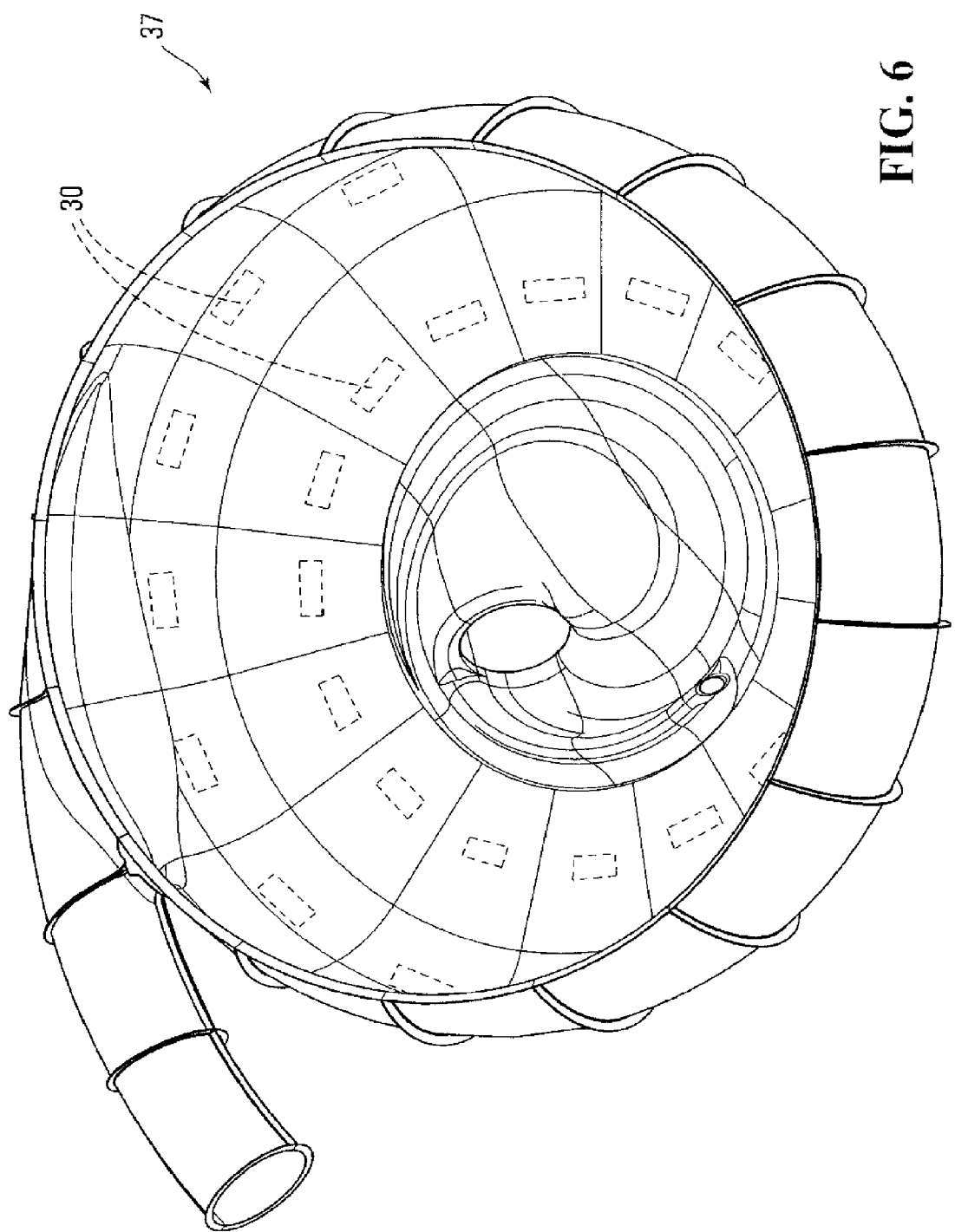
FIG. 6 is a perspective view of a bowl of a second embodiment of the present invention.

Further, although the first embodiment of the present invention has been described in detail in the context of a flume ride, it is to be understood that the present invention may also be applied to other types of sliding amusement rides. For example, FIG. 6 is an illustration of a bowl-style ride 31 or ride feature in which LIM units 30 are embedded around the bowl. Such a bowl-style ride is described in U.S. Design Pat. No. D521,098, issued May 16, 2006, incorporated herein by reference in its entirety. The LIM units 30 can be successively energized to maintain a ride vehicle's motion, including acceleration/deceleration and angular/linear speed, around the bowl before it is released and allowed to corkscrew towards the middle. The LIM units 30 may also be situated to define an upper limit beyond which a vehicle may not travel. This may form an added safety feature or be used in place of the rounded upper contour of the bowl ride 31. The LIM's may be energized successively or be energized dependant on the location of the vehicle in the flume. The operator may control the path of a vehicle to ensure that the path is maintained and each vehicle moves along the same path. Conversely, the operator could vary the vehicle path, by energizing the appropriate LIM to move the vehicle into a selected path.

Figure 7:
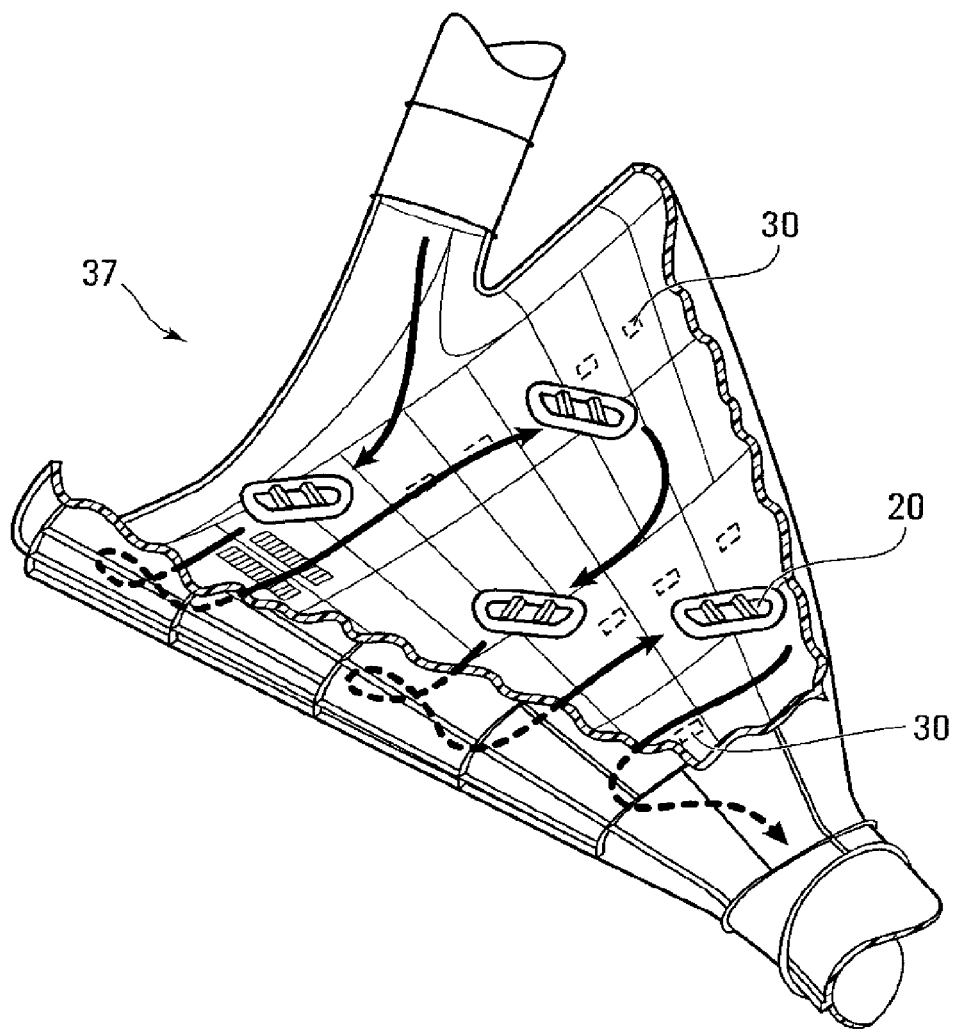
FIG. 7 is a perspective partial cut-away view of a funnel of a third embodiment of the present invention.

FIG. 7 illustrates a funnel-style ride or ride feature 37 in which LIM units 30 are embedded along the sides so as to increase or decrease the amplitude with which the ride vehicle oscillates along the funnel. LIM units 30 can also be embedded at the funnel exit to decrease the speed of the vehicle 20 exiting the funnel. This funnel-style ride is a completed funnel turned on its side and in FIG. 7, an upper side portion of the funnel has been cut away for the sole purpose of showing interior features. Such a funnel ride is described in U.S. Pat. No. 6,857,964 issued Feb. 22, 2005, U.S. Pat. No. 7,056,220 issued Jun. 6, 2006, and in co-pending U.S. application Ser. No. 11/381,557 filed May 4, 2006, each of which is incorporated herein by reference in its entirety.

Figure 8:
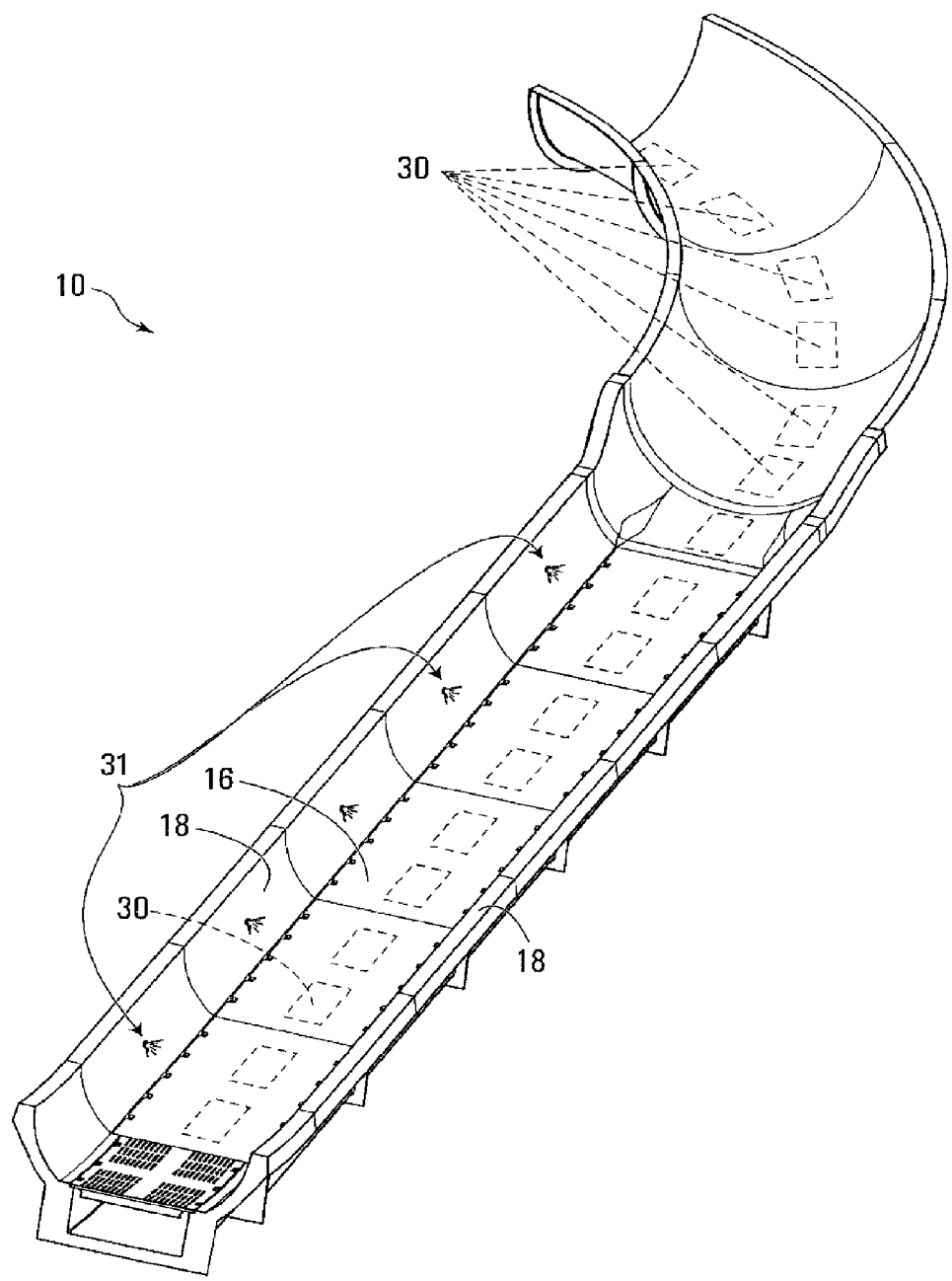
FIG. 8 is a perspective view of an uphill flume section of a fourth embodiment of the present invention.

In an alternative embodiment flume ride feature illustrated in FIG. 8, the invention may be used to accelerate a ride vehicle up a straight incline followed by a curving incline. The reference characters used in FIG. 8 correspond to the reference characters used in FIG. 1. FIG. 8 includes spray nozzles 31. The spray nozzles 31 may spray high pressure water which assists the LIM in guiding the raft up the incline. The spray nozzles 31 may also be used to provide water to lubricate the sliding surface 16. Other examples of how the sliding surface may be lubricated include water outlets in the sliding surface 16 or a water source introducing water from a higher elevation of the ride rather than being a flume amusement ride, the embodiment of FIG. 8 could also be an industrial conveyance system or a public transportation system for people. In such examples, the lubricant may be other then water. The vehicle could be other than a raft. For example, a pallet in an industrial system, or an enclosed car for public transportation.

While the first embodiment has been described as being an uphill section in the middle of a ride, it will be understood that the present invention can be applied in other sections of an amusement ride. For example, the LIM units 30 may be embedded in a horizontal section at the launch station to accelerate the ride vehicle 20 and launch it into the ride. Alternatively, LIM units 30 may be embedded in an uphill section near the launch station so as to either take a ride vehicle 20 containing a rider to the top of a first hill, or to return an empty vehicle 20 to an elevated launch station. Further, LIM units 30 may be embedded at the end of a ride so as to slow down the vehicle 20 as it approaches the end of the ride, or the launch station. Indeed LIM units 30 may be embedded in downhill sections to control the rate of descent of the ride vehicle 20.

Figure 9:
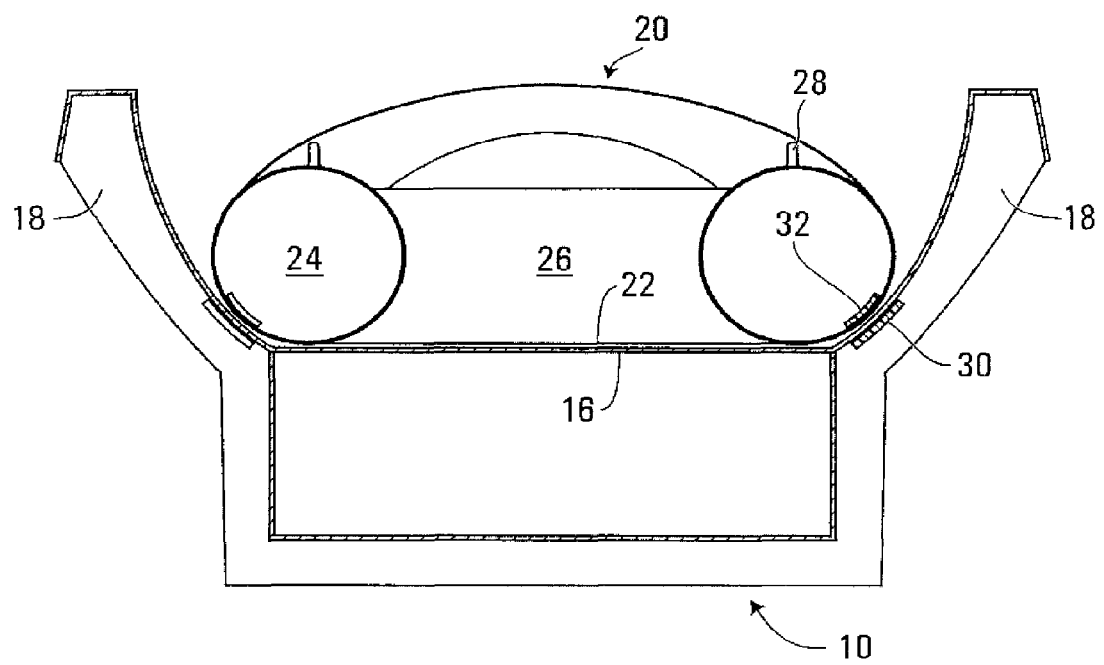
FIG. 9 is a cross-sectional end view of a fifth embodiment of the present invention.

Other modifications are possible. For example, instead of the ride vehicle 20 having only one reaction plate 32, it may have multiple reaction plates 32. Further, as illustrated in FIG. 9, instead of the LIM units 30 being mounted beneath the sliding surface 16 of the flume 10 and the reaction plate 32 being mounted at the bottom of the ride vehicle 20, the LIM units 30 may be mounted outside of and parallel to the side walls 18 of the flume 10 and the reaction plates 32 may be mounted to the ride vehicle 20 such that they are parallel to the side walls 18 of the flume when the ride vehicle 20 is in the flume 10.

It is to be understood that while the LIM in the illustrated embodiment is used to maintain the speed of, or to accelerate the ride vehicle 20, the LIM can also be used to impart other motion control to the vehicle 20. For example, the LIM can be used to decelerate the ride vehicle 20, resist acceleration of the ride vehicle 20 down a slope, or indeed to stop it or reverse its direction. Further, in other LIM unit 30 and reaction plate 32 configurations, the LIM 30 can be used to cause the ride vehicle 20 to rotate or change its angular direction. For example the linear motor force could be arranged off center so that a turning moment is created in the reaction plate 32. Alternatively, adjacent LIM units 30 could thrust in opposite directions to create the turning moment. Additionally, the selective operation of multiple LIM unit sets in angular relationship to each other can cause the ride vehicle 20 to selectively follow different trajectories. The LIM can also be used to cause or assist the ride vehicle 20 in going around corners. Of course, a combination of these motions can also be implemented, for example a LIM which causes the ride vehicle 20 to rotate as it decelerates, or a LIM which causes the ride vehicle 20 to accelerate as it goes around a corner, as shown in FIG. 8.

Figure 10:
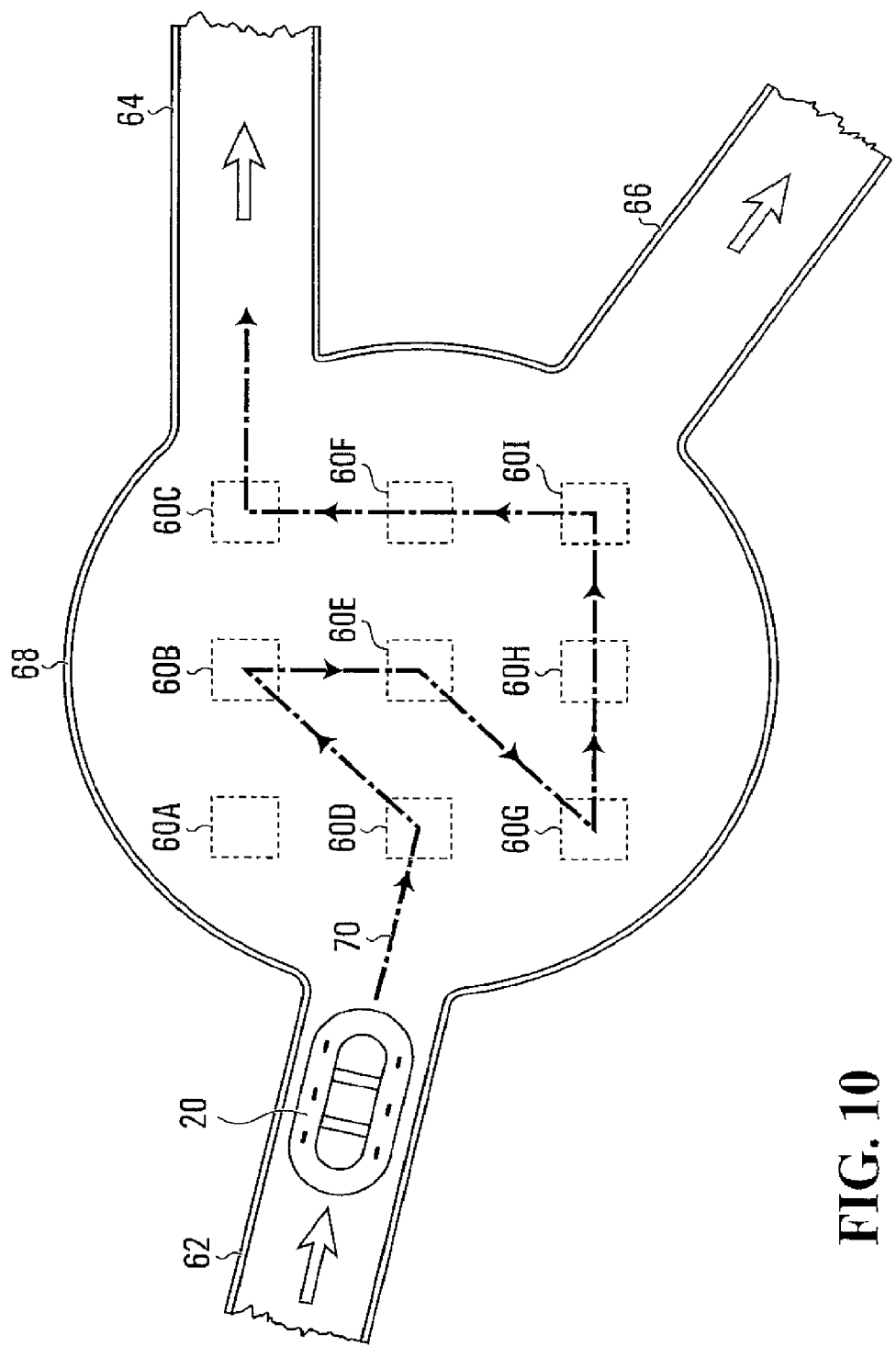
FIG. 10 is a schematic representation of a sixth embodiment of the present invention.

FIG. 10 illustrates a use of an array of LIM units 60A to 60J to slide the ride vehicle 20 on a horizontal ride surface 68. The array of LIM units 60A to 60J are positioned at or just below the ride surface 68. The ride vehicle 20 enters the ride surface 68 through an entrance 62. The LIM units 60A to 60J are energized to move the ride vehicle 20 across the ride surface 68 and out through one of the exits 64 and 66. The selection of the exit 64 or 66 may be determined by user input or by the ride operator. The energizing of the LIM units 60A to 60J may cause the vehicle 20 to move back and forth across the ride surface 68. For example, the vehicle 20 may follow a path such as path 70.

Figure 11:
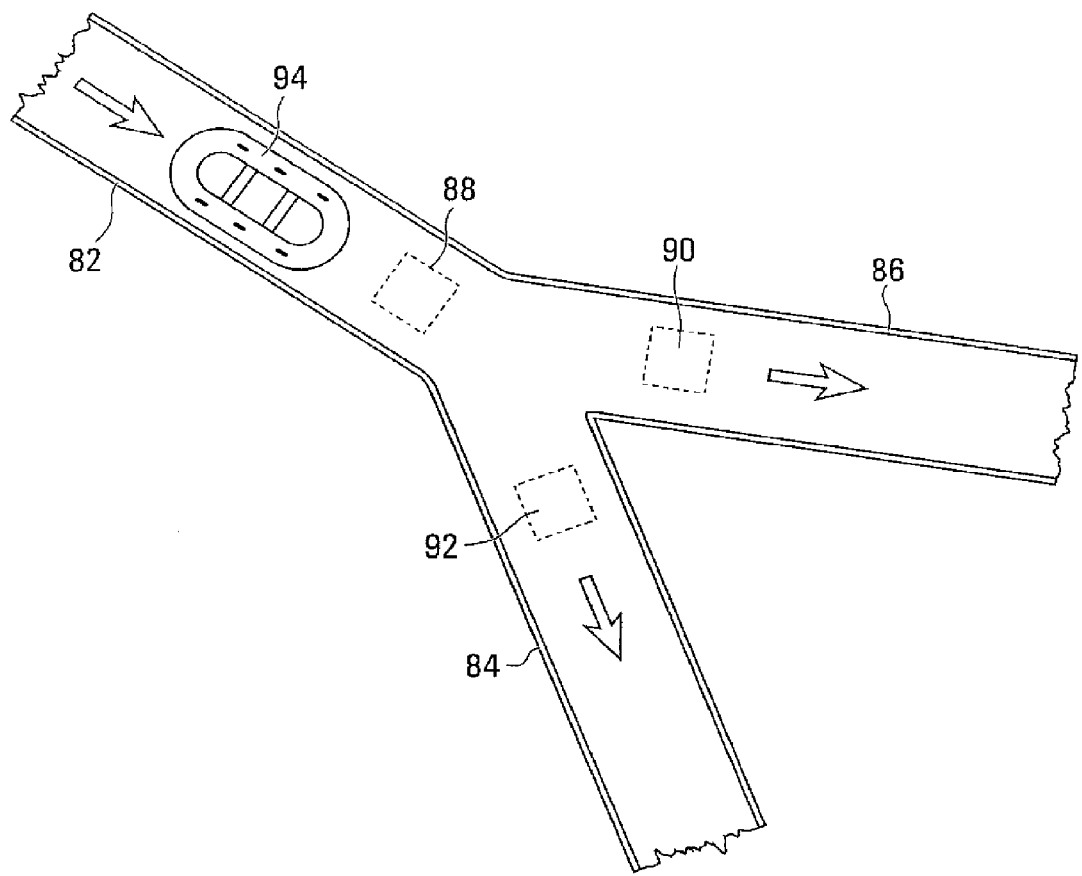
FIG. 11 is a schematic representation of a seventh embodiment of the present invention.

Another embodiment with multiple paths is depicted in FIG. 11. FIG. 11 depicts a flume style water ride 80. The ride 80 has an upper section 82 and first and second lower sections 84 and 86. The upper section 82 has a LIM unit 88 at the flume surface adjacent the end of the section. The first lower section 84 has a LIM unit 92 at the flume surface adjacent the start of that section. The second lower section 86 has a LIM unit 90 at the flume surface adjacent the start of that section. In this example, a raft 94 is travelling down the upper section 82. The raft 94 incorporates a reaction plate (not shown). The raft 94 can travel into either the first lower section 84 or the second lower section 86. The selection of the path may be made by the ride operator or by the user. If the first lower section 84 is selected, the LIM units 88 and 92 will be energized to direct the raft into the first lower section 84. If the second lower section 86 is selected, the LIM units 88 and 90 will be energized to direct the raft into the second lower section 86. It will be understood that more paths may be provided and that the multipath embodiment is applicable to other transportation systems. The number and type and positions of LIM units may be varied to provide the required control of the path of the raft 94 or other vehicle.

Figure 12:
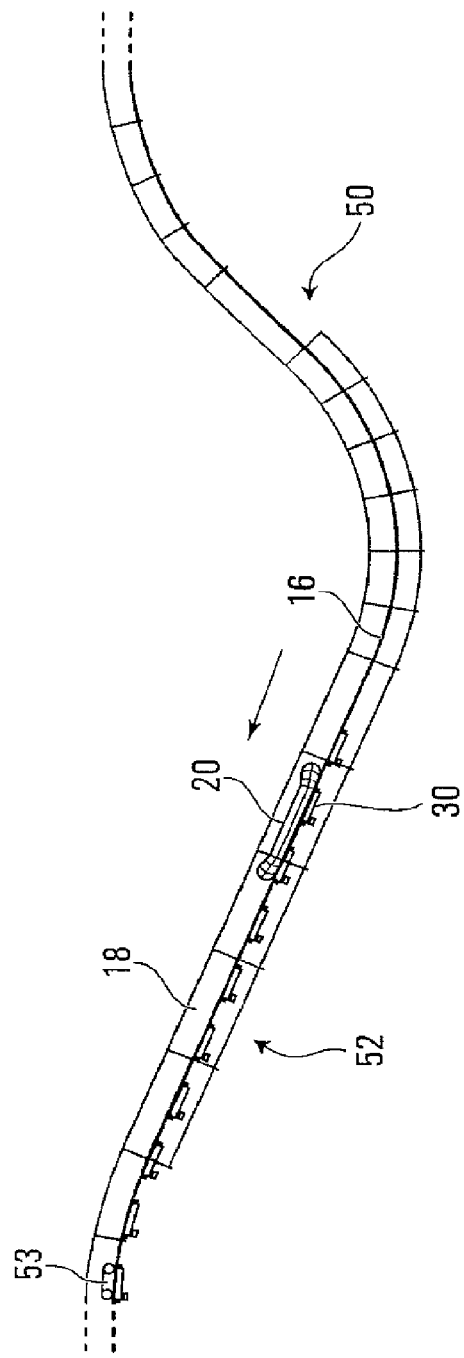
FIG. 12 is a side view of a flume ride feature in accordance with a method of the present invention.

Alternatively, as illustrated in FIG. 12, the LIM can be used to provide other ride motion. For example, in a ride feature comprising a downhill section 50 followed by an uphill section 52, as the vehicle 20 proceeds down the downhill section 50 and up the uphill section 52, the LIM may be operated such that the vehicle 20 reaches a certain height. The LIM may then be deactivated, causing the vehicle 20 to slide backwards down the uphill section 52 and up the downhill section 50. The vehicle 20 will then slide back down the downhill section 50 and up the uphill section 52 whereupon the LIM may be reactivated such that the vehicle 20 reaches the top of the uphill section 52 at a desired speed. The top of the uphill section 52 may contain a wheel or roller based or other locking system 53 which can override the LIM and hold the raft 20 stationary. The locking system 53 may also be utilized at the beginning or end of a ride where people or objects are loaded onto or out of the vehicle. The rollers may be locked by an external means to stop the rolling movement of the vehicle. LIM units may be mounted inside the rollers such that if the "lock" is removed or disengaged, the vehicle, if acted upon by, the LIM units, would start to move in that direction. For example, the vehicle could sit over these rollers, with the rollers in a "locked" state based upon the programming of the system. Once the vehicle is loaded, the lock would be removed and the LIM units would be energized to start the forward motion of the vehicle. Proximity sensors could measure the vehicles movement and speed to ensure that the vehicle has enough forward speed to be properly introduced into the ride. This roller system may only be supplied for a short distanced and then the vehicle would be introduced into the flume.

Figure 13:
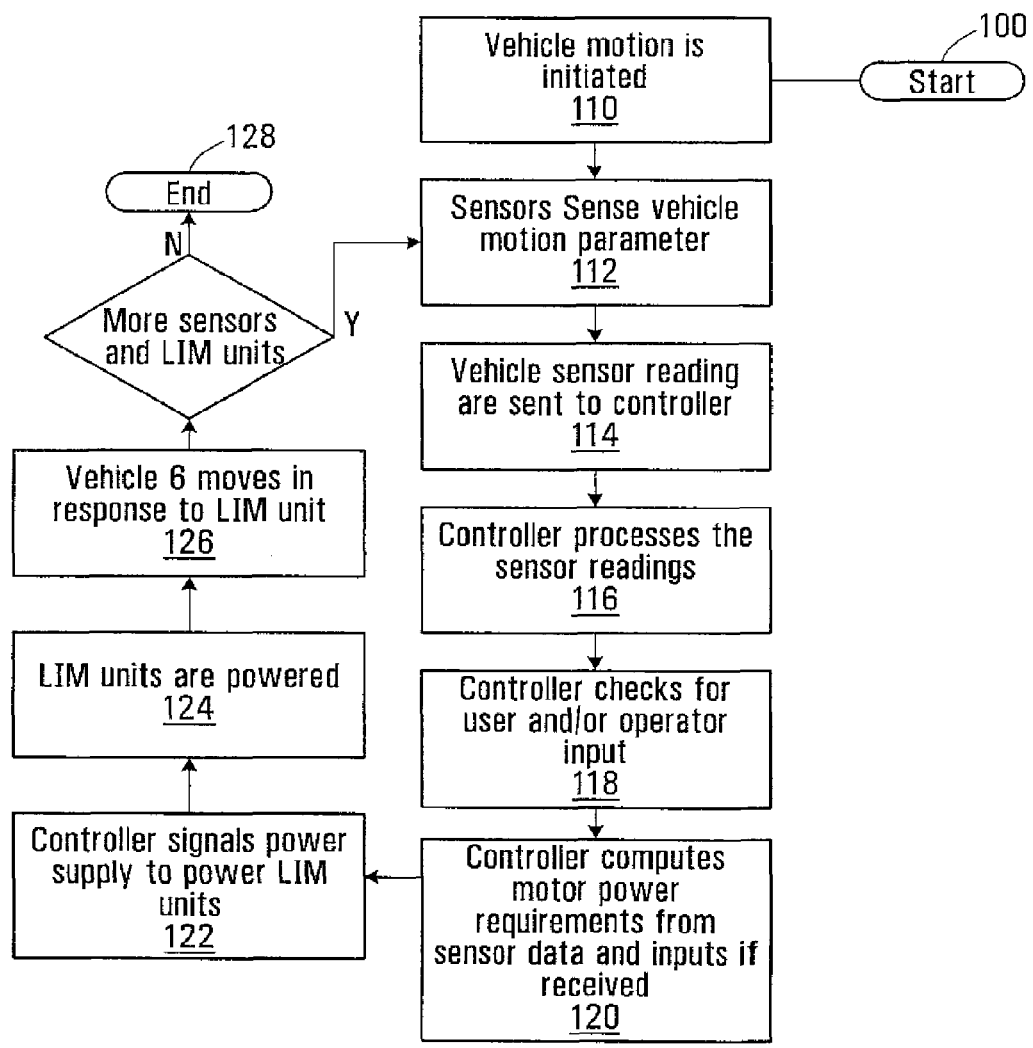
FIG. 13 is a flow chart of an exemplary method of operating a linear motor driven system of an embodiment of the present invention.

FIG. 13 provides a flow chart of an exemplary method of operating a linear motor driven system of an embodiment of the design. The method starts at step 100. In step 110, the motion of the vehicle is initiated. In step 112, sensors sense at least one vehicle motion parameter. In step 114, the sensor readings are sent to a controller. In step 116, the controller processes the sensor readings. In step 118, the controller checks for user input or operator input through a user or operator interface. In step 120, the controller computes the required motor input based on the sensor readings and any inputs. In step 122, the controller signals the power supply to appropriately power the LIM units. In step 124, the LIM units are powered. In step 126, the vehicle moves in response to the LIM units. If there are more sensors and LIM units in the system which the vehicle has not passed then the method will return to step 112. Otherwise, the method will end at 128. It will be appreciated that steps may be added to or omitted from this method. For example the system may not have user and operator inputs. The method may also incorporate steps of stopping and restarting the power to the LIM units.

While the vehicle 20 has been illustrated as a flat-bottomed raft, it is to be understood that the vehicle 20 in accordance with the present invention can be any vehicle adapted to convey at least one person or object in a sliding motion. For example, a rider in a sliding amusement ride, including an inner-tube-style vehicle, a multi-rider vehicle, or a platform vehicle. Other examples are pallets for objects in industrial conveying or enclosed cars for public transportation of people.

While the linear induction motor drive has been described in the as comprising linear induction motor units 30 embedded below the sliding surface 16 and the reaction plate 32 mounted at the bottom of the ride vehicle 20, it is to be understood that other suitable configurations are possible. For example, the linear induction motor units 30 may be mounted at the bottom of the ride vehicle 20 as powered by batteries and controlled remotely, with multiple reaction plates 32 mounted beneath the surface of the ride surface 16.

While the flume 10, the LIM units 30, the reaction plate 32, and other features have been described in some cases as having particular dimensions and being made of particular materials, it will be understood by persons skilled in the art that other dimensions and materials may be used without necessarily departing from the scope of the present invention.

Finally, specific details of the particular LIM utilised in the preferred embodiment of the invention have been provided. However, persons skilled in the art will understand that other types of LIMs having different configurations, specifications, and dimensions can be utilized without necessarily departing from the scope of the present invention.

While induction type linear motors have been described in some detail, it will be appreciated that other types of linear motors, including linear synchronous may be used.

Numerous modifications and variations of the present invention are possible in light of the above teachings. It is therefore to be understood that within the scope of the appended claims, the invention may be practised otherwise than as specifically described herein.

The invention claimed is:

1. A vehicle motion control system comprising:
 a waterslide sliding surface with at least one uphill section and one downhill section;
 a vehicle adapted to slide on said sliding surface; and
 a linear motor associated with the vehicle and the sliding surface for affecting sliding motion of the vehicle on the sliding surface;
 wherein the linear motor comprises at least one linear motor unit mounted to one of the sliding surface and the vehicle and at least one reaction component mounted to the other of the sliding surface and the vehicle;
 wherein motion of the vehicle in the uphill section is controlled at least in part by the linear motor; and
 wherein movement of the vehicle in the downhill section is controlled predominantly by contours of the waterslide sliding surface in combination with gravity.

2. The system of claim 1 wherein the linear motor comprises a linear induction motor.

3. The system of claim 2 further comprising a sensor for detecting at least one of linear speed, angular speed, direction of movement and position of the vehicle.

4. The system of claim 3 further comprising a controller for operating the linear motor as a function of input from the sensor.

5. The system of claim 1 wherein the linear motor comprises a linear synchronous motor.

6. The system of claim 1 further comprising a sensor for detecting at least one of linear speed, angular speed, direction of movement and position of the vehicle.

7. The system of claim 6 further comprising a controller for operating the linear motor as a function of input from the sensor.

8. The system of claim 1 further comprising a user input means.

9. The system of claim 8 further comprising a controller for operating the linear motor as a function of user input.

10. A method of controlling motion of a vehicle sliding on a waterslide sliding surface of an amusement ride, comprising operating a linear motor associated with the vehicle and the sliding surface; wherein the linear motor comprises at least one linear motor unit mounted to one of the sliding surface and the vehicle and at least one reaction component mounted to the other of the sliding surface and the vehicle; wherein the waterslide sliding surface includes at least one uphill section and one downhill section; wherein motion of the vehicle in the uphill section is controlled at least in part by the linear motor; and wherein movement of the vehicle in the downhill section is controlled predominantly by contours of the waterslide sliding surface in combination with gravity.

11. The method of claim 10 wherein the linear motor comprises a linear induction motor.

12. The method of claim 11 wherein controlling motion comprises at least one of accelerating the vehicle, decelerating the vehicle, rotating the vehicle, changing direction of movement of the vehicle, maintaining a speed of the vehicle, and reversing the direction of movement of the vehicle.

13. A method for preventing movement of the vehicle outside the designated area comprising the method of claim 11.

14. The method of claim 11 further comprising sensing at least one of linear speed, angular speed, direction of movement and position of the vehicle and altering the operation of the linear induction motor in response.

15. The method of claim 11 further comprising altering the operation of the linear motor in response to input from a vehicle rider.

16. The method of claim 14 further comprising receiving the input from the vehicle rider through rider operated controls.

17. The method of claim 14 further comprising receiving the input from the vehicle rider through force applied by the rider to a vehicle body.

18. The method of claim 17 wherein the vehicle body incorporates the at least one reaction component and the force applied by the rider alters the shape of the at least one reaction component.

19. The method of claim 14 wherein the vehicle body incorporates the at least one reaction component and the input from the rider alters electrical characteristics of the at least one reaction component.

20. The method of claim 19 wherein the reaction component comprises conductive coils.

21. The method of claim 15 further comprising selecting one of at least two vehicle paths based on the input from the vehicle rider.

22. The method of claim 11 wherein the at least one linear motor unit comprises a plurality of induction units and the method further comprises energizing the induction units to define a path of the vehicle.

23. The method of claim 22 wherein the amusement ride comprises a bowl shaped sliding surface and wherein the induction units are positioned at the sliding surface, the method further comprising energizing the induction units to at least one of decelerate a rate of decent of the vehicle, increase an angular speed of the vehicle and reverse the angular direction of the vehicle.

24. The method of claim 23 wherein the induction units are positioned at an exit from the bowl shaped sliding surface, the method further comprising energizing the induction units to decelerate the vehicle.

25. The method of claim 22 wherein the amusement ride comprises a funnel shaped sliding surface and wherein the induction units are positioned at the sliding surface, the method further comprising energizing the induction units to at least one of decelerate a rate of decent of the vehicle, increase an angular speed of the vehicle and reverse the angular direction of the vehicle.

26. The method of claim 25 wherein the induction units are positioned at an exit from the funnel shaped sliding surface, the method further comprising energizing the induction units to decelerate the vehicle.

27. The method of claim 22 wherein the amusement ride comprises a planar sliding surface and wherein the induction units are positioned at the sliding surface, the method further comprises energizing the induction units to define a path of the vehicle over the planar sliding surface.

28. The method of claim 10 wherein the linear motor comprises a linear synchronous motor.

29. The method of claim 10 further comprising sensing at least one of linear speed, angular speed, direction of movement and position of the vehicle and altering the operation of the linear motor in response.

30. The method of claim 10 further comprising altering the operation of the linear motor in response to input from a vehicle rider.

31. The method of claim 10 wherein controlling motion comprises at least one of accelerating the vehicle, decelerating the vehicle, rotating the vehicle, changing direction of movement of the vehicle, maintaining a speed of the vehicle, and reversing the direction of movement of the vehicle.

32. The method of claim 10 to prevent movement of the vehicle outside a designated area.

33. The method of claim 10 to launch the vehicle up an uphill section.

34. A method for returning the vehicle to a ride starting location comprising the method of claim 10.

35. The method of claim 10 further comprising thrusting with water sprayers.

36. A waterslide ride feature, including:
   a waterslide flume including a waterslide sliding surface having at least one uphill section and one downhill section;
   a vehicle configured to slide on the sliding surface;
   a linear motor associated with the vehicle and the sliding surface for affecting sliding motion of the vehicle on the sliding surface;
   wherein motion of the vehicle in the uphill section of the waterslide flume is controlled at least in part by the linear motor; and
   wherein movement of the vehicle in the downhill section of the waterslide flume is controlled predominantly by contours of the waterslide flume in combination with gravity.

* * * * *